United States Patent [19]
Kind

[11] 3,794,097
[45] Feb. 26, 1974

[54] PNEUMATIC TIRE
[75] Inventor: Guy Kind, Bellevue, Luxembourg
[73] Assignee: The Goodyear Tire & Rubber Company, Akron, Ohio
[22] Filed: Nov. 2, 1972
[21] Appl. No.: 303,164

Related U.S. Application Data
[63] Continuation of Ser. No. 114,922, Feb. 12, 1971, abandoned.

[52] U.S. Cl. .............................. 152/356, 152/361 R
[51] Int. Cl. .............................................. B60c 9/18
[58] Field of Search......... 152/356, 359, 361, 362 R

[56] References Cited
UNITED STATES PATENTS
3,667,529   6/1972   Mirtain .............................. 152/356

*Primary Examiner*—Gerald M. Forlenza
*Assistant Examiner*—Robert Saifer
*Attorney, Agent, or Firm*—F. W. Brunner; H. E. Hummer

[57] ABSTRACT

A pneumatic tire with flat wire cords in the carcass plies and breaker strips for annularly reinforcing the tire.

5 Claims, 3 Drawing Figures

PNEUMATIC TIRE

This is a continuation, of application Ser. No. 114,922 filed Feb. 12, 1971 and now abandoned.

BACKGROUND OF THE INVENTION

The invention is particularly well suited for use with tires having carcass plies reinforced with radially oriented cords, i.e., cords disposed at angles in the range of from 70° to 90° measured from a plane passing through the mid-circumferential centerline of the tread of the tire, such plane hereinafter referred to as the centerplane. Some radial type tires manufactured today, employ metal reinforcement cords in the carcass or body of the tire and belts or breakers used to annularly reinforce the tire. Generally, these cords are circular in cross-section and are composed of a number of individual wires twisted together. Other tires, not the radial type, have utilized flat metal cords in belts for annularly reinforcing the tires. In such cases, however, the flat metal cords are disposed in planes parallel to the centerplane. The invention is directed to a particular combination of flat metal cords in a radial tire.

Briefly stated, the invention is in a pneumatic tire having at least one carcass ply reinforced with metal cords disposed at similar angles in the range of from 70° to 90° measured from the centerplane of the tire. A pair of breakers are circumferentially disposed around the carcass ply in the area of the tire tread. Each of the breakers is reinforced with parallel metal cords disposed at similar angles in the range of from 10°–45° measured from the center-plane of the tire, the reinforcement cords of adjacent breakers being measured in opposite directions from the centerplane. The reinforcement cords in the breakers have a rectangular cross-section, the width (W) of the cords being in the range of from 0.5 to 2 millimeters, and the gauge (G) of the cords being in the range of from 0.12 to 1 millimeter.

DESCRIPTION OF THE DRAWING

The following description of the invention will be better understood by having reference to the annexed drawing, wherein.

DESCRIPTION OF THE INVENTION

Figure 1:
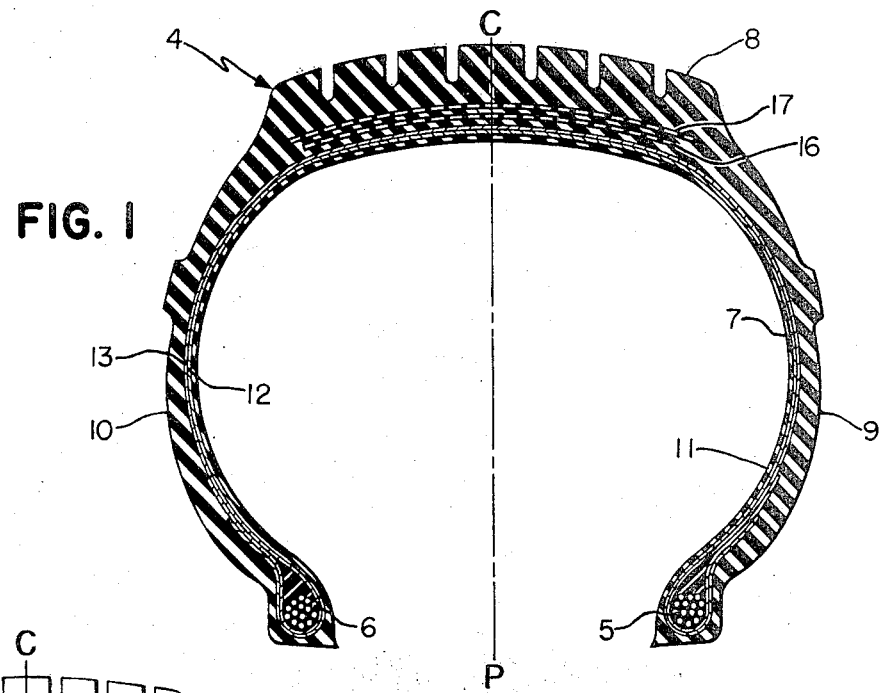
FIG. 1 is a cross-section of a tire made in accordance with the invention.
Figure 2:
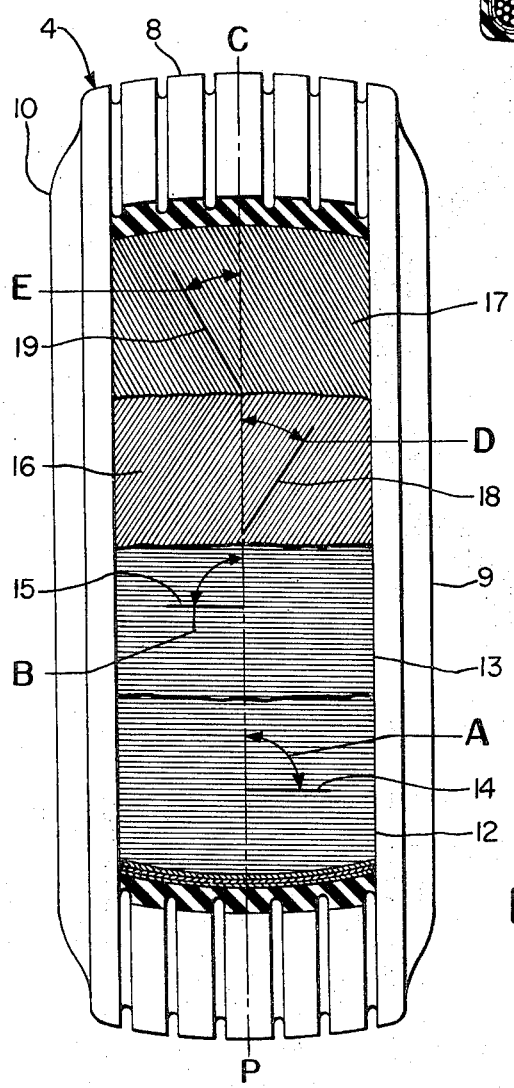
FIG. 2 is a top view of a portion of the tire with a section removed to show the angular disposition of the cords reinforcing the tire.

Referring more particularly to the drawing, there is shown a pneumatic tire generally indicated at 4. The tire 4 comprises a pair of annular beads 5 and 6; a radial ply tire body or carcass 7 extending between and wrapped around the beads 5 and 6; a tread 8 carried by the tire carcass 7 in opposed relation to the beads 5 and 6; and a pair of sidewalls 9 and 10 extending from the tread 8 and terminating at the beads 5 and 6. An air-impervious innerliner 11 is used for producing a tubeless tire 4. The configuration of the tire 4 is symmetrical from the centerplane.

The tire carcass 7 comprises a plurality of carcass plies 12 and 13 composed of rubberized material reinforced with a number of cords 14 and 15, which extend in a radial direction, i.e., the cords 14 and 15 in each of the carcass plies 12 and 13, are disposed at similar angles in the range of from 70 to 90° measured from the centerplane. The cords 14 and 15 of adjacent carcass plies 12 and 13 are disposed at angles (A) and (B) measured in opposite directions from the centerplane and, in this particular case, the cords 14 and 15 are disposed at similar angles (A) and (B) of 90°.

A pair of breakers 16 and 17 are provided for reinforcing the tire 4 annularly. The breakers 16 and 17 are disposed circumferentially around the outer carcass ply 13 in the area of the tread 8. The breakers 16 and 17 are composed of strips of rubberized material reinforced with a number of cords 18 and 19. The cords 18 and 19 in each of the breakers 16 and 17, are parallel and disposed at similar angles in the range of from 10° to 45° measured from the centerplane. The cords 18 and 19 of adjacent breakers 16 and 17 are disposed at angles (D) and (E) measured in opposite directions from the centerplane.

Figure 3:
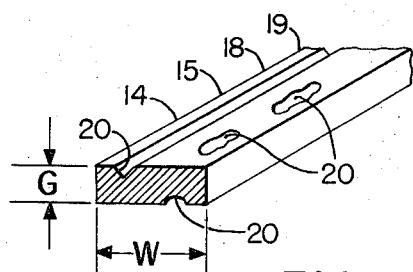
FIG. 3 is a perspective view of a portion of a flat wire reinforcement cord.

The reinforcement cords 14 and 15 in the carcass plies 12 and 13, and the reinforcement cords 18 and 19 in the breakers 16 and 17 (FIG. 3), are preferably composed of flat solid wire having a rectangular cross-section in a radial plane passing through the centerpoint of the tire 4, the width (W) of the solid wire being in the range of from 0.5 to 2 millimeters, and the thickness or gauge (G) of the solid wire being in the range of from 0.12 to 1 millimeters.

A plurality of indents 20 are provided in the outer surfaces of each of the flat wire cords 14, 15, 18, and 19, for increasing the adhesion between the cords and the rubberized material. The indents 20 may be elongated to form U or V-shaped grooves, which are preferably disposed in the wire cords in parallel relation to the longitudinal axis of the cords. Sandblasting could be used to roughen the surface of the wire cords with indents 20 to increase the adhesion between the cords and rubberized material.

Thus, there has been provided a pneumatic tire having flat wire cords for reinforcing either the tire carcass or breakers, or both. The rectangular cross-section of the wire cords provides higher stiffness in a transverse or lateral direction of the tire and a lower stiffness in the radial direction of the tire. Thus, the lateral stability of the radial tire is increased without seriously affecting the deflection characteristics of the tire. The use of flat wire is more economical, since flat wire is more easily produced than circular wire formed from a number of individual strands of smaller wire twisted together. The angular disposition of the reinforcement cords 14, 15, 18, and 19, described in the specification and following claims, is in relation to an uninflated, vulcanized tire.

While certain representative embodiments and details have been shown for the purpose of illustrating the invention, it will be apparent to those skilled in the art that various changes and modifications may be made therein without departing from the spirit or scope of the invention.

What is claimed is:

1. A pneumatic tire, comprising:
   a. a tread;
   b. a pair of beads;
   c. a pair of sidewalls extending from the tread and terminating at the beads;

d. at least one carcass ply with reinforcement cords disposed at similar angles in the range of from 70° to 90° measured from the centerplane of the tire;

e. at least one pair of breakers disposed circumferentially around the carcass ply in the area of the tread, each of the breaker plies including reinforcement cords disposed at similar angles in the range of from 10° to 45° measured from the centerplane of the tire, the reinforcement cords of the breakers being metal, the gauge (G) of each breaker cord being in the range of from 0.12 to 1 millimeters and the width (W) of each breaker cord being in the range of from 0.5 to 2 millimeters; and f. means for increasing the surface area of each of the metal breaker cords contacted by rubber material of the tire, said means including a plurality of grooves which extend longitudinally in each of the metal breaker cords.

2. The tire of claim 1, wherein the breaker cords are flat wires.

3. The tire of claim 1, wherein the reinforcement cords of the carcass ply are also metal and have a gauge (G) in the range of from 0.12 to 1 millimeters and a width (W) in the range of from 0.5 to 2 millimeters.

4. The tire of claim 1, wherein the grooves have a V-shaped cross-section.

5. The tire of claim 1, wherein the grooves have a U-shaped cross-section.

* * * * *